United States Patent
Johnson et al.

(10) Patent No.: US 9,191,347 B2
(45) Date of Patent: *Nov. 17, 2015

(54) METHODS OF ROUTING MESSAGES USING A LISTENER REGISTRY

(71) Applicant: AT&T Intellectual Property I, L.P., Atlanta, GA (US)

(72) Inventors: Brett Dennis Johnson, Acworth, GA (US); Larry Kent, Jr., Loganville, GA (US); Charles Frederick Hart, Atlanta, GA (US); Matthew Campbell, Atlanta, GA (US); Donald H. Fair, Cumming, GA (US); Thomas Hackbarth, Marietta, GA (US); Bruce Peterson, Flowery Branch, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/286,583

(22) Filed: May 23, 2014

(65) Prior Publication Data

US 2014/0258431 A1 Sep. 11, 2014

Related U.S. Application Data

(63) Continuation of application No. 11/524,103, filed on Sep. 20, 2006, now Pat. No. 8,737,579, which is a continuation-in-part of application No. 11/316,432, filed on Dec. 22, 2005, now abandoned, application No. 14/286,583, which is a continuation-in-part of application No. 11/311,765, filed on Dec. 19, 2005.

(60) Provisional application No. 60/705,112, filed on Aug. 3, 2005, provisional application No. 60/718,251, filed on Sep. 16, 2005.

(51) Int. Cl.
G06F 9/54 (2006.01)
H04L 12/58 (2006.01)
H04L 29/06 (2006.01)

(52) U.S. Cl.
CPC .............. *H04L 51/046* (2013.01); *G06F 9/544* (2013.01); *G06F 9/546* (2013.01); *H04L 51/14* (2013.01); *H04L 63/123* (2013.01)

(58) Field of Classification Search
None
See application file for complete search history.

(56) References Cited

U.S. PATENT DOCUMENTS

| | | | | |
|---|---|---|---|---|
| 4,741,026 | A | * 4/1988 | Baxter et al. | 379/204.01 |
| 5,754,636 | A | * 5/1998 | Bayless et al. | 379/142.1 |
| 5,940,488 | A | * 8/1999 | DeGrazia et al. | 379/93.23 |
| 6,018,571 | A | * 1/2000 | Langlois et al. | 379/201.04 |

(Continued)

*Primary Examiner* — Fan Tsang
*Assistant Examiner* — Jeffrey Lytle
(74) *Attorney, Agent, or Firm* — Myers Bigel Sibley & Sajovec, P.A.

(57) ABSTRACT

A method of routing messages may include providing a listener registry of a plurality of listeners and associated namespaces so that at least one namespace is associated with each of the plurality of listeners. A message may be received from an originating application, and the message may include a message namespace. The message may be stored in a message queue, and a determination may be made to determine if a listener from the listener registry is associated with the message namespace. If no listener from the listener registry is associated with the message namespace, the message may be stored in a parked message queue separate from the message queue. After the message has been in the parked message queue for a predetermined period of time, the message may be deleted from the parked message queue.

11 Claims, 12 Drawing Sheets

(56) References Cited

U.S. PATENT DOCUMENTS

| | | | |
|---|---|---|---|
| 6,259,449 B1 * | 7/2001 | Saxena et al. | 715/853 |
| 6,311,209 B1 * | 10/2001 | Olson et al. | 70/204 |
| 6,513,060 B1 * | 1/2003 | Nixon et al. | 709/203 |
| 6,691,154 B1 * | 2/2004 | Zhu et al. | 709/204 |
| 7,006,614 B2 * | 2/2006 | Feinberg et al. | 379/164 |
| 7,120,455 B1 * | 10/2006 | Chen et al. | 455/466 |
| 7,317,716 B1 * | 1/2008 | Boni et al. | 370/352 |
| 7,330,876 B1 * | 2/2008 | Rawat et al. | 709/205 |
| 7,564,958 B1 * | 7/2009 | Contractor | 379/93.15 |
| 7,860,932 B2 * | 12/2010 | Fried | 709/206 |
| 2001/0005415 A1 * | 6/2001 | Grunsted et al. | 379/350 |
| 2002/0021774 A1 * | 2/2002 | Callaghan et al. | 375/354 |
| 2002/0031211 A1 * | 3/2002 | Fullarton et al. | 379/201.01 |
| 2002/0075303 A1 * | 6/2002 | Thompson et al. | 345/751 |
| 2003/0073430 A1 * | 4/2003 | Robertson et al. | 455/416 |
| 2004/0018828 A1 * | 1/2004 | Adler | 455/405 |
| 2004/0022369 A1 * | 2/2004 | Vitikainen et al. | 379/67.1 |
| 2005/0102297 A1 * | 5/2005 | Lloyd et al. | 707/100 |
| 2005/0256931 A1 * | 11/2005 | Follmeg et al. | 709/206 |
| 2005/0262205 A1 * | 11/2005 | Nikolov et al. | 709/206 |
| 2006/0223554 A1 * | 10/2006 | Fried | 455/466 |

* cited by examiner

```xml
<message>
    <header>
        <namespace>myapp.myname</namespace>
        <reply>myapp.myname.reply</reply>
    </header>
    <dictionary>
        <item1>this is item one</item1>
        <item2>12.34</item2>
        <whatevername><whatevervalue></whatevername>
    </dictionary>
    <arrays>
        <itemlist>first item</itemlist>
        <itemlist>second item</itemlist>
        <itemlist>third item</itemlist>
        <otherlist>ABC</otherlist>
        <otherlist>123</otherlist>
    </arrays>
</message>
```

Figure 3

```
//////////////////////////////////////////////////////////////
// BTextCrypt.h: interface for the plain text encryption class
// ifndef _BTEXTCRYPT_H_CLASS_DEFINITION_
define _BTEXTCRYPT_H_CLASS_DEFINITION_1 using namespace std;

class BTextCrypt
{
public:
        BTextCrypt();
        BTextCrypt ( char* const _key );
        virtual ~BTextCrypt();
        virtual bool setKey ( const char* _key );
        virtual const char decryptc( const char _c, const char _k );
        virtual const char encryptc( const char _c, const char _k );
        virtual bool encrypts ( char* const _buf );
        virtual bool decrypts ( char* const _buf );
        static string newKey();

private:
        char m_key[ 1024 ];
};

#endif // _BTEXTCRYPT_H_CLASS_DEFINITION_
```

Figure 5.A
BTextCrypt.h

```
///////////////////////////////////////////////////////////////
// BTextCrypt.cpp: implementation of the plain text encryption class
//
#include "stdafx.h"
#include "stdio.h"
#include <stdlib.h>
#include <string.h>
#include <time.h>
#include <string>
#include "BTextCrypt.h"
BTextCrypt: :BTextCrypt ()
{
        memset ( m_key, 0, sizeof( m_key ) );
}

BTextCrypt: :BTextCrypt ( char* const _key )
{
        setKey( _key );
}

BTextCrypt: :BTextCrypt ()
{
}
bool BTextCrypt: :decrypts( char *const _buf )
{
        if( 0 == *m_key )
        {
                return false;
        }
        try
        {
                const int keylength = ( int ) strlen ( m_key );
                const int length = ( int ) strlen ( _buf );
                int y = 0;
                for ( int i = 0; i < length; i++ )
                {
                        const int c = decryptc( _buf[ i ], m_key[ y ] );
                        _buf[ i ] = c;
                        y++;
                        y %= keylength;
                }
                _buf[ length ] = 0;
                return true;
        }
        catch ( ... )
        {
        }
        return false;
}
bool BTextCrypt: :encrypts( char *const _buf )
{
        //LOGGER_TRACE_ENTER
        if( 0 == *m_key )
        {
                return false;
        }
        try
        {
                const int keylength = ( int ) strlen( m_key );
                const int length = ( int ) strlen( _buf );
                int y = 0;
                for ( int i = 0; i < length; i++ )
```

Figure 5.B.1
BTextCrypt.cpp

```cpp
            {
                    const int c = encryptc( _buf[ i ], m_key[ y ] );
                    const char c2 = decryptc( c, m_key[y] );
                    if ( c2 1 = _buf[i] )
                    {
                            // TODO: clean this up
                            //trc( LOC, "FAILURE: %d (original %d)", c2, _buf[i] );
                            return false;
                    }
                    _buf[ i ] = c;
                    y++;
                    y %= keylength;
            }
            _buf[ length ] = 0;
            return true;
    }
    catch ( ... )
    {
    }
    return false;
}
const char BTextCrypt::encryptc( const char _c, const char _k )
{
    int n = _c;
    int z = toupper( _k );
    if ( ' ' <= _c && '~' >= _c )
    {
            const int cn = ( int )( _c - ' ' );
            const int kn = ( int )( z - ' ' );
            n = ( cn + kn ) % ( ( int ) ( '~' - ' ' ) +1 );
            n += ( int ) ' ';
    }
    return n;
}
const char BTextCrypt::decryptc( const char _c, const char _k )
{
    int n = _c;
    int z = toupper( _k );
    if ( ' ' <= _c && '~' >= _c )
    {
            const int cn = ( int )( _c - ' ' );
            const int kn = ( int )( z - ' ' );
            n = ( cn - kn );
            if ( n < 0 )
                    n += ( ( int ) ( '~' - ' ' ) +1 );
            n += ( int ) ' ';
    }
    return n;
}
bool BTextCrypt::setKey( const char* _key )
{
    memset( m_key, 0, sizeof( m_key ) );
    strncpy( m_key, _key, sizeof( m_key ) -1 );
    return ( strlen( _key ) > strlen( m_key ) ) ? false : true;
}
string BTextCrypt::newKey()
{
    char key( 128 );
    srand( ( unsigned )time( 0 ) + 1234 );
    memset( key, 0, sizeof( key ) );
```

Figure 5.B.2
BTextCrypt.cpp

```
for ( int x = 0; x < sizeof( key ) -2; x++ )
{
        char c = ( char ) ( ( rand() % ('~' - '') ) = '');
        key[ x ] = c;
}
string s = key;
return s;
}
```

Figure 5.B.3
BTextCrypt.cpp

```
<message>
 <header>
  <namespace>client.handshake</namespace>
  <reply>bpd.handshake</reply>
 <header>
 <dictionary>
  <key>j 0982q-0r3728-rhuiwe&1t;uf89-qwery124n0crjh2...</key>
  <hash>jfpasf9023&1t;4m124u512>3jr1c4r&quo;j89-14u38934&...</hash>
 </dictionary>
 <arrays/>
</message>
```

Figure 6A
Sample Challenge

```
<message>
 <header>
  <namespace>bpd.handshake</namespace>
 </header>
 <dictionary>
  <hash>34j mr81f5>nmgv9257ynht02934thu9014u38934&...</hash>
 </dictionary>
 <arrays/>
</message>
```

Figure 6B
Sample Response

METHODS OF ROUTING MESSAGES USING A LISTENER REGISTRY

CROSS REFERENCE TO RELATED APPLICATIONS

This Application is a continuation of U.S. application Ser. No. 11/524,103 filed Sep. 20, 2006, which is a continuation-in-part of U.S. application Ser. No. 11/316,432 filed Dec. 22, 2005 which claims the benefit of priority to U.S. Provisional Patent Application No. 60/705,112, filed Aug. 3, 2005. This Application is also a continuation-in-part of U.S. application Ser. No. 11/311,765 filed Dec. 19, 2005, which claims the benefit of priority to U.S. Provisional Patent Application No. 60/718,251, filed Sep. 16, 2005. The disclosures of each of the above referenced provisional and utility applications are hereby incorporated herein in their entirety by reference.

FIELD OF THE INVENTION

The present invention generally relates to the field of communications services, and more particularly to methods of coordinating different applications.

BACKGROUND

Electronic communication services, such as local and long distance telephone service, television service, and radio service have been available to consumers for years, and have been widely adopted and used. These longstanding communication services are characterized by ease of operation, limited user interfaces, and relatively high reliability. These factors may help explain why such services have been widely adopted by a large number of people, to the point where television, telephone and radio service is ubiquitous in most countries.

However, due in part to their simplicity, traditional communication services have been limited in many ways. For example, traditional telephone service relies on wireline connections, which may limit the mobility of users. Likewise, traditional television service provides a one-way flow of information from broadcaster to viewers, with little or no ability for viewers to configure the service according to personal preferences.

In recent years, traditional communication services have become more flexible, intelligent, and feature-rich. For example, traditional wireline telephone service providers now offer enhanced services such as call forwarding, call waiting, caller ID, voicemail and the like. Similarly, with the advent of broadband television services through cable and satellite networks, television service providers now offer configurable on-demand television services to subscribers.

At the same time as traditional communication services have become more flexible, intelligent, and feature-rich, the types of available communication services have proliferated, driven in large part by the expansion of the internet. For example in addition to enhanced telephone, television and radio services, a consumer may have access to the internet for email communication, instant messaging, video chat, voice over IP (VoIP) telephony, television over IP (IPTV), and/or other communication services. In addition, wireless communication services have provided additional options for both voice communication and data communication and messaging using, for example, short message service (SMS) and/or multimedia message service (MMS) communications.

In fact, communication services have proliferated to the point where it may be difficult and/or time consuming for a user to manage all of the different communication services that are available to the user. It may be particularly difficult for a user to manage a variety of communication services that have different user interfaces and/or software applications relating thereto. From the perspective of the service provider, a primary concern is that users may be less likely to adopt new communication services that are seen as complex and/or that operate differently from communication services with which they are more familiar.

Accordingly, there continues to exist a need in the art to provide improved interaction between different communications services and/or software applications relating thereto.

SUMMARY

According to some embodiments of the present invention, a method of routing messages may include providing a listener registry of a plurality of listeners and associated namespaces so that at least one namespace is associated with each of the plurality of listeners. A message may be received from an originating application with the message including a message namespace, and the message may be stored in a message queue. A determination may be made if a listener from the listener registry is associated with the message namespace. If no listener from the listener registry is associated with the message namespace, the message may be stored in a parked message queue separate from the message queue. After the message has been stored in the parked message queue for a predetermined period of time, the message may be deleted from the parked message queue.

The message may also include an identification of a target application. If no listener from the listener registry is associated with the message namespace, starting of the target application identified in the message may be initiated, and connection of the target application may be accepted.

Responsive to accepting connection of the target application, the message in the parked message queue including the identification of the target application may be identified. Responsive to identifying the message in the parked message queue, the message may be transmitted from the parked message queue to the target application.

If a listener from the listener registry is associated with the message namespace, the message may be transmitted to the listener. Moreover, the message may be received at a message router residing on a consumer communications device, and each of the originating application and listener may both reside on the consumer communications device. In an alternative, the message may be received at a message router residing on a consumer communications device, and at least one of the originating application and/or the listener may reside on a device remote from the consumer communications device.

In addition, a second message may be received with the second message including a second message namespace, and the second message may be stored in the message queue. A listener from the listener registry may be identified that is associated with the message namespace, and the second message may be transmitted to the listener. Moreover, the first and second messages may be deleted from the message queue.

According to some other embodiments of the present invention, a method of routing messages may include providing a listener registry of a plurality of listeners and associated namespaces so that at least one namespace is associated with each of the plurality of listeners. A message may be received from an originating application wherein the message includes a message namespace and an identification of a target application, and the message may be stored in a message queue. A determination may be made to determine if a listener from the listener registry is associated with the message namespace. If no listener from the listener registry is associated with the message namespace, the message may be stored in a parked message queue separate from the message queue, and starting of the target application may be initiated. After initiating starting, connection of the target application may be accepted, and responsive to accepting connection of the target application, the message in the parked message queue including the identification of the target application may be identified. After identifying the message, the message may be transmitted from the parked message queue to the target application.

After transmitting the message, the message may be deleted from the parked message queue. If a listener from the listener registry is associated with the message namespace, the listener from the listener registry may be identified, and after identifying the listener, the message may be transmitted to the listener. The message may be received at a message router residing on a consumer communications device, and each of the originating application and the listener may both reside on the consumer communications device.

In an alternative, the message may be received at a message router residing on a consumer communications device, and at least one of the originating application and/or the listener may reside on a device remote from the consumer communications device.

A second message including a second message namespace may be received, and the second message may be stored in the message queue. A listener from the listener registry that is associated with the second message namespace may be identified, and the message may be transmitted to the listener. In addition, the first and second messages may be deleted from the message queue.

According to still other embodiments of the present invention, a method of routing messages may include providing a listener registry of a plurality of listeners and associated namespaces so that at least one namespace is associated with each of the plurality of listeners. A message may be received from an originating application with the message including a message namespace, and the message may be stored in a message queue. A determination may be made to determine if a listener from the listener registry is associated with the message namespace. If no listener from the listener registry is associated with the message namespace, the message may be stored in a parked message queue separate from the message queue, and the message may be deleted from the message queue.

After the message has been in the parked message queue for a predetermined period of time, the message may be deleted from the parked message queue. The message may include an identification of a target application, and if no listener from the listener registry is associated with the message namespace, starting of the target application may be initiated and connection of the target application may be accepted.

Responsive to accepting connection of the target application, the message in the parked message queue including the identification of the target application may be identified, and responsive to identifying the message in the parked message queue, the message may be transmitted from the parked message queue to the target application.

If a listener from the listener registry is associated with the message namespace, the listener from the listener registry may be identified. After identifying the listener, the message may be transmitted to the listener. The message may be received at a message router residing on a consumer communications device, and each of the originating application and the listener may both reside on the consumer communications device. In an alternative, the message may be received at a message router residing on a consumer communications device, and at least one of the originating application and/or the listener may reside on a device remote from the consumer communications device.

BRIEF DESCRIPTION OF THE DRAWINGS

FIG. 3 illustrates examples of message formats according to embodiments of the present invention.

FIGS. 5A and 5B illustrate examples of hash algorithms for client application connection security according to embodiments of the present invention.

FIGS. 6A and 6B illustrate examples of security messages according to embodiments of the present invention.

DETAILED DESCRIPTION

Figure 1:
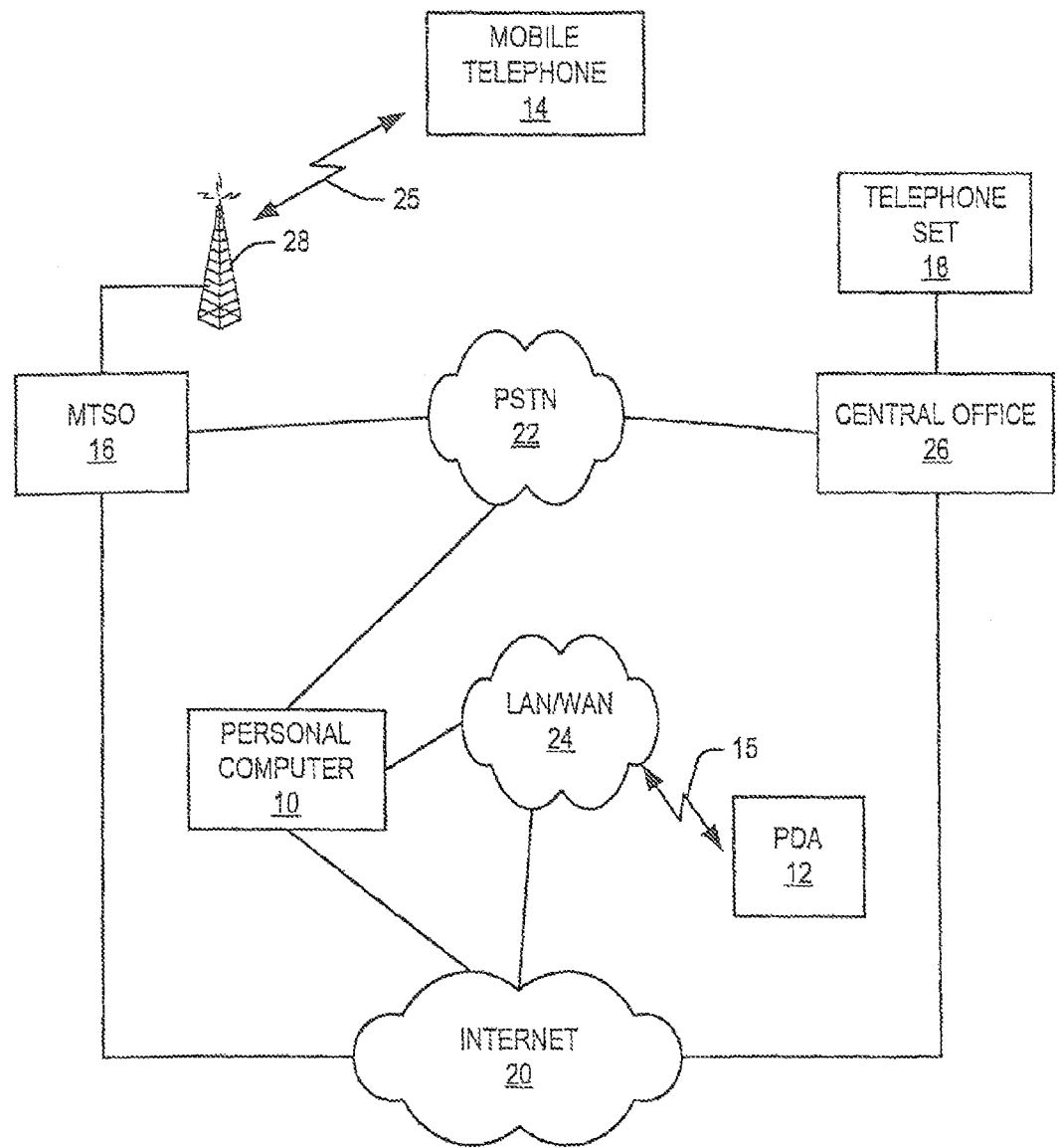
FIG. 1 is a block diagram illustrating examples of communication networks, systems, and devices according to embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

It will be understood that, when an element is referred to as being "coupled" to another element, it can be directly coupled to the other element or intervening elements may be present. In contrast, when an element is referred to as being "directly coupled" to another element, there are no intervening elements present. Like numbers refer to like elements throughout.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense expressly so defined herein.

The present invention may be embodied as methods, apparatus, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, or transport the program for use by or in connection with the instruction execution system, apparatus, or device.

The computer-usable or computer-readable medium may be, for example but not limited to, an electronic, magnetic, optical, electromagnetic, or semiconductor system, apparatus, device, or other tangible medium. More specific examples (a nonexhaustive list) of the computer-readable medium would include the following: a portable computer diskette, a random access memory (RAM), a read-only memory (ROM), an erasable programmable read-only memory (EPROM or Flash memory), and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described below with reference to block diagrams and/or operational illustrations of methods, apparatus, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

FIG. 1 is a block diagram illustrating a number of consumer communication devices that may be used by a consumer to access various communication services. For example, a consumer may have a number of consumer communication terminals, including, for example, a personal computer 10, such as a desktop, laptop and/or palmtop computer, a personal digital assistant (PDA) 12, a mobile telephone 14 used to communicate over a wireless telephone system and/or a telephone handset 18 used to communicate over a landline telephone system.

Each communication terminal may be configured to access one or more voice and/or data communication networks. For example, the computer 10 may be configured to communicate via an internet protocol-based network, such as the internet 20, and/or via another type of network such as a public switched telephone network (PSTN) 22 and/or other public and/or private data communication networks. The computer 10 may be configured to communicate over a wireless and/or wired local area/wide area network connection (LAN/WAN) 24.

The user may have a personal digital assistant (PDA) 12, which may be configured to communicate via the internet 20 and/or via a LAN/WAN network 24 using one or more network protocols. Likewise, the user may have a mobile telephone 14 that is connected to a mobile telephone switching office (MTSO) 16 via a wireless connection 25 to a base station 28. The MTSO 16 may in turn be connected to the internet 20 to permit the mobile telephone 14 to establish IP-based communications using the internet 20. The MTSO 16 may also be connected to the PSTN 22 to permit the mobile telephone to establish a voice communication with a telephone handset connected to the PSTN 22. The MTSO 16 may also be connected to a backbone communication network (not shown) that manages calls to other wireless terminals.

A mobile telephone can communicate via the base station 28 using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and Universal Mobile Telecommunications System (UMTS). With a wireless LAN (WLAN) module, the mobile telephone 14 may also communicate using a communication protocol that may include, but is not limited to, 802.11a, 802.11b, 802.11e, 802.11g, and/or 802.11i. A mobile telephone 14 may also be configured to communicate directly over the PSTN 22.

A mobile telephone 14 may be configured to transmit and/or receive a digital data signals using, for example, the MTSO 16, the PSTN 22 and/or another network. However, it will be appreciated that data communication, such as communication using SMS services, may be accomplished without using the MTSO 16 or the PSTN 22.

A standard telephone set 18 may be used to make local and/or long distance telephone calls to other terminals connected to the PSTN 22. Such telephone calls are managed by a central switching office 26.

While consumer communication devices, such as a personal computer, a personal digital assistant, a telephone set, and/or a mobile telephone are discussed by way of example, embodiments of the present invention may be implemented on other communication and/or computing devices known to those having skill in the art and/or developed in the future. Moreover, functionalities of one or more communication devices illustrated in FIG. 1 may be combined in a single device. For example, a mobile telephone may include the functionality of a personal digital assistant, a personal digital assistant may include the functionality of a personal computer, and/or a single communication device may include the functionality of a mobile telephone, a personal digital assistant, and a personal computer.

Figure 2:
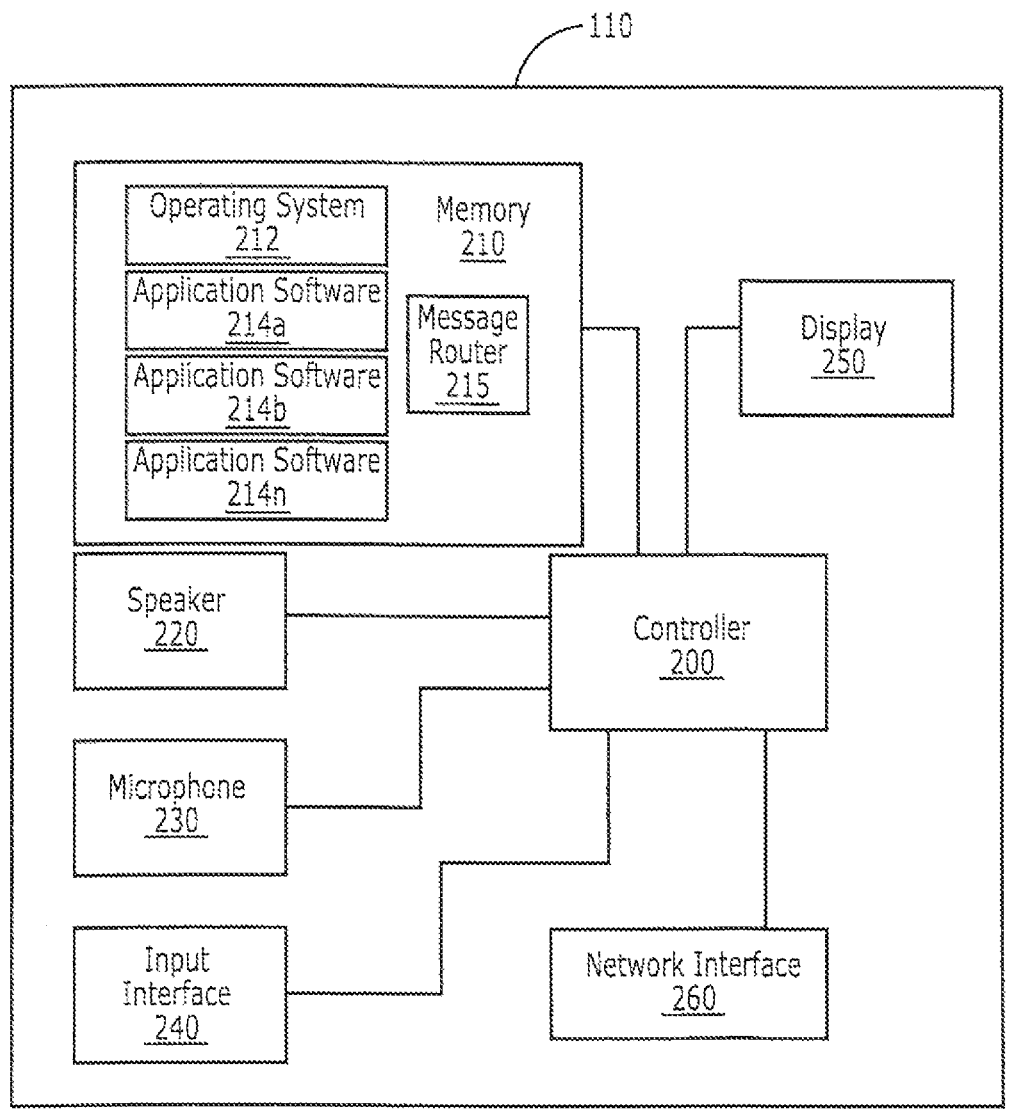
FIG. 2 is a block diagram illustrating examples of consumer communication devices according to embodiments of the present invention.

FIG. 2 is a block diagram of a consumer communication device 110 according to some embodiments of the present invention. The consumer communication device 110 may be, for example, a personal computer (e.g., desktop, laptop, palmtop computer), a personal digital assistant, and/or a mobile telephone. The consumer communication device 110 may include a controller 200, memory 210, speaker 220, microphone 230, user input interface 240 (e.g., touch screen overlay on display 250, keyboard, and/or mouse device), display 250, and network interface 260. Accordingly, a user may select a portion of a window, button, or other portion of a displayed image by, for example, touching a corresponding portion of the display 250, moving a cursor into a corresponding area of the image, and/or clicking a mouse button or actuating another defined device while the cursor at least partially overlaps a corresponding area of the image. If the consumer communication device 110 is a data communication/processing device (such as a personal computer and/or a personal digital assistant), the speaker 220 and/or the microphone 230 may be omitted.

The memory 210 is representative of the overall hierarchy of memory devices including an operating system 212, various application software modules 214a-n, and a message router 215 according to embodiments of the present invention. Each of the application software modules 214a-n include program code that when executed by the controller 200 provides the functionality of the consumer communication device 110 according to at least some of the embodiments described herein. Each of the application software modules 214a-n, for example, may configure the controller 200 to provide a different functionality, such as e-mail, video chat, Voice over Internet Protocol (VoIP), wireless telephone service, short message service (SMS), wireline telephone service, broadband television service, instant messaging, internet protocol television (IPTV), and/or other internet protocol (IP) or non internet protocol (IP) based service. Services that may be provided by different application software modules 214a-n are discussed, for example, in U.S. patent application Ser. No. 11/316,432 filed Dec. 22, 2005, and in U.S. patent application Ser. No. 11/311,765 filed Dec. 19, 2005, the disclosures of which are hereby incorporated herein in their entirety by reference. As discussed in greater detail below, the message router 215 may facilitate communication and/or interaction between application software modules of the same or different consumer communication devices and/or service providers.

The network interface 260 is configured to communicatively interface the consumer communication device 110 to the Internet 160, to the LAN/WAN 24, to the PSTN 22, to the MTSO 16, and/or to the central office 26, and may include, for example, a broadband data modem, such as a cable Internet modem, a Digital Subscriber Line (DSL) Internet modem, and/or a wireless network Internet modem that utilizes a wireless protocol such as, for example, a cellular protocol (e.g., General Packet Radio System (GPRS), Enhanced Data Rates for Global Evolution (EDGE), Global System for Mobile Communications (GSM), code division multiple access (CDMA), wideband-CDMA, CDMA2000, and/or Universal Mobile Telecommunications System (UMTS)), a wireless local area network protocol (e.g., IEEE 802.11), a Bluetooth protocol, and/or another wireless communication protocol.

The Message Router 215 may provide a core unit of converged services on a consumer communication device (also referred to as a consumer or customer computer). A purpose of the message router 215 is to allow disparate applications (e.g., application software modules 214a-n also referred to as client applications or processes), which would otherwise have no knowledge of each other, to interact, send commands, and share information across applications on the same consumer communication device 110 and even across networks.

Messages and/or commands may be asynchronously routed to client applications based on routing namespaces, hereafter referred to as "namespaces." These processes may be within a process space of the Message Router 125 itself, or these processes may be external applications and/or dynamic services. The messages may also provide return routing, if desired, in an asynchronous manner.

By using external application connections, new service provider (e.g., telephone service provider) applications and/or services that were previously non-existent or unknown to the consumer communication device 110, operating system 212, application software modules 214a-n, and/or message router 215 can attach themselves to the Message Router 215 on the consumer communication device 110 at run time and provide services, for example, in a converged services desktop immediately.

The message router 215 according to embodiments of the present invention, may provide relative ease (as compared to Window's specific protocols such as COM Component Object Model and/or DCOM Distributed Component Object Model) of quickly adding and removing converged-type services on a local consumer communication device, such as a user desktop computer, and/or on the Internet or other network. Moreover, message routers 215 according to embodiments of the present invention may be combined with the flexibility of XML (Extensible Markup Language) and/or the capabilities of XMPP (Extensible Messaging and Presence Protocol) to provide a powerful and flexible platform to converge user applications and services into one loosely coupled, agile, interactive, and rich-featured unit. The message router 215 may not require stubs and/or an interactive data language (IDL). Moreover, the message router 215 and/or its clients may be implemented, for example, using Perl or Java so that the message router 215 may not be binary (compiled). In addition, the message router 215 may use an XML dictionary and/or arrays section for its interface, which may be changed literally on the fly.

A basic framework for the message router 215 may be provided using a common message format, routing namespaces, and a listener registry. A routing namespace (also referred to as "namespace") may provide a nucleus of the message router 215. A general format for a routing namespace may be similar to a domain name and/or similar to a Java namespace. A routing namespace may include names separated by periods. According to some embodiments of the present invention, a routing namespace may have the following characteristics:

1. Characters of the namespace may be printable characters (not non-visible printer control and formatting characters, such as carriage return, linefeed, tab, etc.)
2. The names in the namespace may be separated by periods.
3. The first name in the namespace may be the name of the original application that creates a listener for it (usually the application that is the intended consumer, for instance, a listener that exposes a service or consumes notifications, etc.) There may be exceptions to this rule. For example, some notifications may be meant for general consumption and may thus have no specific target. In these cases, a descriptive name for the general category of message may be used. If the first name is not the name of an application, guaranteed delivery (as discussed in greater detail below) may not typically be available for that namespace.

Wildcards may be used after the last period (.) in a routing namespace. The use of a wildcard may allow Listeners to register for multiple messages at a time. According to some embodiments of the present invention, wildcards are not to be inserted into the messages themselves, and instead may be intended only for Listener registration. The message router 215, however, could be designed to address a message to any listener having a given prefix, using a wild card in the message namespace.

The client applications that create these namespaces may attempt to use unique names that are not likely to confuse other Listeners. There are times when multiple client applications might deliberately Listen for the same messages on the same namespaces for different purposes.

All client application developers may share a central namespace glossary in which namespaces that expose services or consumers of services are published. Publication of a central namespace glossary may promote two goals:

1. First, teams may verify that new namespaces they are creating do not conflict with existing namespaces.
2. Second, other teams may have access to the wealth of services that other converged applications provide. In this way, services or message feeds that are created by one team with one intent in mind may be used by another application of which the team had no previous knowledge.

Messages that flow through the Message Router 215 may be in a standard XML (Extensible Markup Language) format. These messages may include any kind of data that can be translated into ASCII text, such as binary data that may be transformed into text. On a high-volume server, this kind of transformation process may be prohibitive, but this kind of transformation process may not to be prohibitive on a consumer communication device such as a consumer computer, where a volume of messages would typically be relatively low.

An XML Message for the message router 215 according to embodiments of the present invention may have three level-two tags, representing three main sections including:

1. a header section;
2. a dictionary section; and
3. an arrays section.

An example of an XML message format for a message router 215 according to embodiments of the present invention is illustrated in FIG. 3.

The header section may be used to control routing of messages through the Message Router 215 and/or one or more networks coupled through the network interface 260.

1. The foremost element in the headers section may be a namespace tag. Data in the namespace tag may include a routing name (referred to hereafter as the "namespace") that is used to route the message to any subscribers. Routing Namespaces are discussed above in greater detail.
2. A "reply" tag (also referred to as the "reply namespace") may be provided in the event that the sender (or producer) expects a response returned from the receiver (or consumer). In this case, the Listener for this reply may be created before sending the initial message. Of course, this namespace may also conform to the characteristics discussed above with respect to routing namespaces.
3. In addition, an "action" tag may be provided in the header section when sending a command to the message router 215, as opposed to sending a message to be forwarded to another application. An "action" tag may include in its data area one of the following: a message, a register command, or an unregister command. This tag may only be relevant in the context of an external client application connection through client proxy 407. Message router client application connections are discussed in greater detail below. In summary:
    a. Messages may go directly to the Message Router 215 for distribution or through the client proxy 407 to the message router 215.
    b. A register command may be used to register as a Listener on behalf of that external application on that connection for the listed namespace.
    c. An unregister command may undo a register command.
    d. An ondestroy command may register a message to be put in the queue when the destructor for that connection is called. This may happen if the application connection is lost, whether by normal or abnormal shutdown.
    e. An ondestroy command with a dictionary tag of "delete" with a value of "true" may remove the command whose ID corresponds to the "id" tag in the dictionary.
4. Other header tags may be inserted here and simply passed along with the message and such other header tags may be informational only. Other header tags might be used to debug or track, such as <version>, <time>, etc.

The dictionary section may include the data to be delivered. The dictionary section may be freeform, as long as it conforms to certain characteristics as set forth below:

1. The consumer application may be the only application having prior knowledge of the format and name(s) of the data included in this section. In addition, the producer application may also have at least one known consumer application at the time of creation.
2. Each dictionary data item may be included in a sub-tag with a DOM (Document Object Model) addressable name.
3. Each data item may be encoded to reduce DOM corruption and confusion. Encoding may be done by encoding "unsafe" XML characters into their HTML (Hypertext Markup Language) entity representation (e.g., '<', '>', '"', '&', etc.)

As long as appropriate rules (such as the characteristics set forth above) are followed, the dictionary section may include any type and length of data (including no data at all), from notifications to commands to queries and more.

According to some embodiments of the present invention, the arrays section may include any array-type data. According to some other embodiments of the present invention, the arrays section may be combined with the dictionary section. Other than the ability to use non-unique tags inside the arrays section, the same characteristics discussed above with respect to the dictionary section may also apply to the arrays section.

Figure 4:
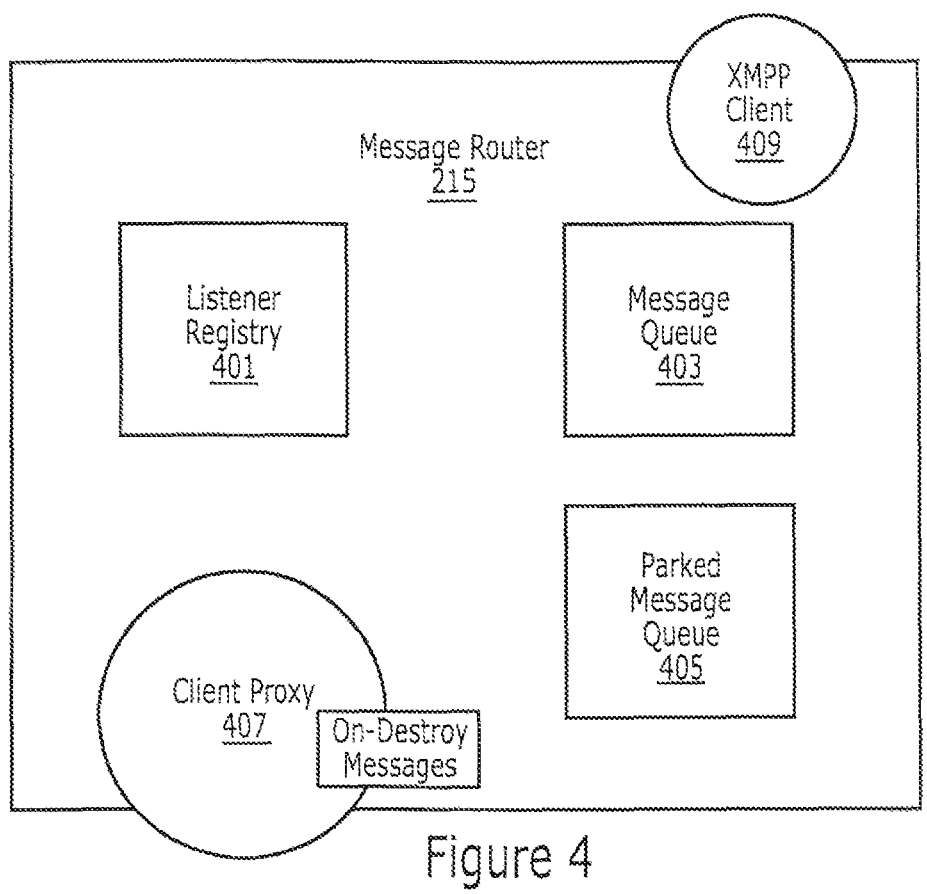
FIG. 4 is a block diagram illustrating examples of message routers according to embodiments of the present invention.

As shown in FIG. 4, a message router 215 according to some embodiments of the present invention may provide a listener registry 401, a message queue 403, and a parked message queue 405. Each time a message is created by an application (either resident on the consumer communication device 110 or outside the consumer communication device 110) and forwarded to the message router 215, the message router 215 may push the message onto the message queue 403. The message queue 403 may be a global static object that operates in a first-in-first-out manner.

The listener registry 401 may be provided by the Message Router 215 to identify recipient(s) of each message that is pushed onto the message queue 403. The listener registry 401 may be a simple global static list of listener objects similar to that of the IListener interface. The IListener class may have an abstract method named process, which each inheritor implements, which takes an XML Message as its single parameter. Each Listener may register for a namespace in a format as discussed above with respect to routing namespaces.

The message router 215 may "wake up" each time a message is pushed onto the message queue 215, and on waking up, the message router 215 may:

1. Pull the oldest message off the queue;
2. Read the namespace from the message;
3. Search the Listener Registry sequentially for listeners of that namespace;
4. Execute a polymorphic "process" method (as provided, for example, by the C++ language), passing the message to process; and
5. Move down the list of objects in the Listener Registry, executing each one.

Each Listener object may execute the message in a way that makes sense for the application that created it. In some cases, such as with external client applications, the listener object might hold a socket identifier (for example, provided by client proxy 407) that the Listener writes the message to. In other cases, the listener object might pass the message to a dynamic service that executes an operation and returns the results.

Moreover, all listeners should process messages in a non-blocking manner to avoid freezing the message router 215. Any operation that may have potential to block on any given instruction should be executed in a separate thread. By definition, client applications may have separate execution spaces (for example, provided by client proxy 407), and each client application may therefore handle messages in any way that makes sense and/or is appropriate for the respective client application.

According to some embodiments of the present invention, the message router 215 may provide converged services through external client applications connections. These connections may be made via a TCP/IP (Transmission Control Protocol/Internet Protocol) socket server (for example, provided by client proxy 407), which may make proxy registrations for the client applications and route messages to them. Using a TCP/IP socket server (for example, provided by client proxy 407), any client application may be quickly and simply added to the converged services suite provided by the message router 215. In other words, the client applications may expose their services for general use, and likewise may use services exposed by other applications on the consumer's computer, and even across the web.

The message router 215 socket server may be exposed on a well-known port only to connections local to the consumer communication device 110. On Windows, the port may be published to the current user in the HKEY_CURRENT_USER area of the registry. (This may be one of only two instances in which the message router 215 uses the registry.) The socket server (for example, provided by client proxy 407) may spawn a separate thread to handle each connection. Each thread may be encapsulated in a client application connection object (for example, provided by client proxy 407) that represents that external client application to the message router 215.

All client applications that connect to the message router 215 may be required to pass a relatively simple challenge and reply by client application connection (for example, provided by client proxy 407) security before being allowed to connect. If the reply to the challenge is wrong, the connection may be dropped with no further response.

A simple hash algorithm used by client application connection security may be implemented in any moderately sophisticated language, as illustrated, for example, in the C++ code of FIGS. 5A and 5B. This hash algorithm may be applied to a hash buffer to create a key to "unlock" a client application's TCP/IP connection to the message router 215.

1. Upon the initial connection, a client application may receive a message as shown, for example, in FIG. 6A, but with much longer values in the key/lock fields. The client application may be required to decode both the key and hash fields before they are usable.
2. The client application may apply the provided key to the hash to create a reply hash.
3. The client application may reply with a message as shown, for example, in FIG. 6B, but with a much longer reply hash field. The client application may be required to create encoded values when sending the return hash reply. Characters (such as "gator mouths") that might confuse an XML parser should be converted and/or encoded. Otherwise, sign-on may be rejected.

A client application may register for namespaces using a provided proxy (such as client proxy 407), as discussed above with respect to the header section of a message. In this case, the client application connection may create an entry for that namespace on behalf of the external client application. Any message that is sent to this listener may be written straight to the external client application's socket connection (for example, using client proxy 407).

If the client application supports "Guaranteed Delivery" (described in greater detail below with respect to message router guaranteed execution), the client application may register through the client proxy 407 for all messages with its starting namespace. For instance, if the client application is a VON application, the client application may register for "von.*".

As used herein, the term "guaranteed" is a relative term in that delivery is not absolutely guaranteed, for example, when delivery is beyond programmatic control. For example, guaranteed execution does not necessarily provide execution if there is a power interruption, if the cost of guaranteeing execution in a particular circumstance exceeds an associated cost, and/or if a particular situation is unforeseen. The message router 215, however, may provide a reasonable guarantee for the execution of two kinds of messages:

1. Messages that are sent before the target application is running, or guaranteed delivery; and
2. Messages that are sent after the target application terminates, either in a controlled or uncontrolled manner, or on-destroy commands.

If the application supports guaranteed delivery, the application may register for all messages with its starting namespace. For example, if application is a VON application, it may register for "von.*". In addition, the application may have an entry in an Application Configuration or Description File (such as an applicationslist.xml file) that matches this name ("von"). Moreover, the application may implement a singleton to reduce multiple instances of the application being started by guaranteed delivery operations.

1. When the message router 215 gets a request for a specific listener application, the message router 215 may search the listener registry 401 for an application with a name that matches that starting namespace. For example, the message router 215 may search the listener registry 401 for the namespace "von.*" as discussed above.
2. If a namespace for the specific listener application does not exist in the listener registry 401, the message may be parked in a parked message queue 405 and assigned a timestamp used to limit the existence of the message in the parked message queue 405. This timestamp may follow the message through all Message Router 215 operations relating to the message, even if the message is parked and released several times. After this time limit defined by the time stamp expires, the message may be considered "defunct" and may be purged from the system.
3. The message router 215 may then attempt to start an application by that name, using the Application Configuration or Description File as a reference.
4. Once the application starts and its client application connection is up, the client application connection proxy will first search the parked message queue 405 for any waiting messages. The message router 215 may process as many parked messages until all parked messages in the parked message queue have been exhausted.
5. During this process, the Message Router 215 may make several attempts to dump the parked message back into the message queue 403. If the parked message is not purged by one of these processes within the timeout period, then it may be considered "defunct" (because all available avenues have been taken to attempt delivery), and the message may be deleted.

On-destroy commands may be considered a type of "guaranteed" execution, even if the application dies suddenly, as long as the client application connection destructor is called. An on-destroy command may register messages to be put in the Message Queue when the destructor for that connection is called. The destructor for a connection may be called, for example, if the application TCP/IP connection is lost, whether by normal shutdown or abnormal termination. The on-destroy command may be useful for any number of critical cleanup jobs, like updating presence, etc.

The Message Router 215 may provide an XMPP (Extensible Messaging and Presence Protocol) Client application connection (for example, using client proxy 407). A client application may be logged on to an XMPP server using sign on authentication of some type, for example, an SSO (Single sign-on) token or reusing the user ID and password via a standard logon.

Once an XMPP session has been established and presence for that client application is published, any client application may use the XMPP pipe as if they are attached directly on that connection. An XMPP document may be sent to the XMPP client application object, for example, via a message to the namespace: bpd.frame.services.jabberservice. The document may be inserted into the message dictionary inside a tag named "<xmpp>". The XMPP client application object may listen for messages with this namespace, and may extract the document from the message and write it directly to the server exactly as is with conversion. Any replies may be handled by the entity on the XMPP server that receives them. The XMPP standard may provide that the ID attribute always returns the ID that the sender assigned to it.

Any type of XMPP document may be sent to or from an XMPP server using methods discussed above. For example, a standard presub message or an XMPP "message" message having an XML structure identical to that of FIG. 3 may be used with the only difference being the use of an XMPP "to" attribute in the root level of the message for XMPP routing purposes.

There are currently three types of XMPP messages that come in from the XMPP server that are recognized by the XMPP Client application object. A first type of XMPP message is a login reply. The purpose of a login reply message is to evaluate the success of the login command. Login reply messages are not passed to the Message Queue 403.

A second type of XMPP message is a pubsub notification. By convention, a "<payload>" tag is inside a pubsub notification. This tag includes an attribute named "xmlrouter". Any namespace assigned to this attribute may be used to route the messages from the XMPP server to message router client applications.

A third type of XMPP message is a message router format message with a "to" attribute assigned to the user ID. This attribute may bridge a gap between a standard format XMPP "message" (typically used for direct communication between instant messenger client applications) and a message router format according to embodiments of the present invention. The "to" attribute may be used to route inside the XMPP server, and the namespace may be used to route to a specific listener application once the message arrives at the consumer desktop computer. The "to" attribute may allow remote control by help desk support personnel to send commands (such as debug level and logging commands) directly to a consumer's desktop computer. In the future, the "to" attribute may be enhanced to allow remote control of any message router client application, including applications such as home security and healthcare surveillance equipment, movie recording equipment, and/or home climate control devices. In addition, there may be provided a way to authenticate that the user that has sent a message has the right to do so, for example, via a security token controlled by an SSO server. In this case, a message that comes in this manner may be parked and the token may be validated with the server before placing the message in the message queue. A unique return ID may be used to provide granularity to message authentication.

In addition to external applications, dynamic services may be loaded or unloaded on the fly in the message router 215 at run-time. These dynamic services may differ from external applications in that they may be dynamic libraries, for example, CORBA (Common Object Requested Brokered Architecture) or COM (Component Object Model) or in-process DLLs (Dynamic Link Libraries). A connection path to the dynamic service may be updated and stored in the Application Configuration or Description File, where it is added by a run-time message to load the new service. These services may then be immediately used by message router 215.

A suite of common services may also are available to all applications attached to the message router. These dynamic services are discussed in greater detail below.

A transient information store service may provide a universal store for name value pairs. The namespace for this service may be "bpd.frame.services.tss". The transient information service may provide three possible "command" values in the dictionary: "get," "put," and "remove." These "command" values may do what they say. The "Get" command value may take an array of keys and return a dictionary of name value pairs. The "Put" command value may take a dictionary of name value pairs and store them. The "Remove" command value may take an array of key values and delete them. In addition, "Put" key-value pairs may be stored in the dictionary. "Get" and "remove" key names may be placed in the arrays section under the key name "key". An authentication key (such as an SSO token) may be stored in transient info store under the key "SMSESSION" and can be retrieved by any interested application. The user ID may be stored here under "USERNAME" and the password may be stored here under "PASSWORD." The three values above may only be available while the user is logged in.

A start application service may take an application name and command line parameters and start that application. The namespace for this service may be "bpd.frame.services.startappservice". The "command" key in the dictionary may be the application name, and as many parameters as is desired may be added to arrays with the key name "param".

A token refresh service may refresh the SSO token. The namespace for the token refresh service may be "bpd.frame.services.tokenrefreshrequest".

A logging level Service may change the logging level to a logging level specified in the message. Available logging levels that may be assigned to "level" in the dictionary may be:
 1. debug;
 2. error;
 3. info;
 4. warn;
 5. fatal;
 6. all; and
 7. off.

The namespace for this service may be "bpd.frame.services.logginglevel".

A shutdown service may shut down the consumer communication device 110 running the message router 215 and send a broadcast message to all client applications that are being shutting down. The namespace may be "bpd.frame.services.shutdown".

A namespace for an XMPP client service application may be "bpd.frame.services.jabberservice". The XMPP client service application may provide a universal access to a consumer communication device 110 jabber connection (for example, using XMPP client 409). The XMPP client service application may hold open the Jabber communications channel. The XMPP client service application may also provide for bi-directional traffic that will receive messages from the Jabber server. These messages may be of two types.

1. PUB/SUB; and
2. POINT to POINT

The message format may allow the routing of messages from the server to the listeners that will be interested in the information. The message format used to route a message to the server is described, along with the information used to receive a reply from the Jabber server.

An "xmpp" key in the dictionary may hold an XMPP template, and any replacement values that are required may be added as key-value pairs in the dictionary.

An example of a template message that is used within BPD may be:

```
<iq id=\"$$ID\" type=\"set\">
<query xmlns=\"jabber:iq:auth\">
<username>$$USERNAME</username>
<password>$$PASSWORD</password>
<resource>bpd</resource>
</query>
</iq>
```

Where the dictionary parameters may be:
"ID"="BPD_LOGIN"
"USERNAME"="ekabug"
"PASSWORD"="probe"

The ID field shown in the iq message may be sent to the XMPP server and may be the same field in a reply that is sent back from the XMPP server.

The ID field may be important if a reply to a message is expected from the XMPP server. Then, the ID may be set to a registered listener NAMESPACE in an example using BPD_LOGIN because this may be a system level message that will not be routed back through the message router 215. The ID field should follow the NAMESPACE convention (e.g. "appname.myname.reply"). The message router 215 may find the registered listener appname.* and route the message back to the application that will then handle the message.

A web page launcher service may provide a universal access to a Web Browser. The service may start a web browser with a desired URL displayed. By setting a secure flag, the browser may be able to access the NetTegrity protected URLs. The namespace for this service may be "bpd.frame.services.webbrowser". The dictionary value "url" may be the address of the web page. A secure connection to that URL may be used by assigning "true" to the dictionary value "secure".

According to embodiments of the present invention, different listeners such as different application software modules 214a-n (also referred to as applications or client applications) running on the same and different consumer communication devices 110 (such as a personal computer, a mobile telephone, and/or a PDA) may interact using the message router 215. As discussed above, messages may be routed through the message router 125 using namespaces included in the messages to be routed, and the listener registry 401 may be used by the message router 215 to associate different namespaces with respective applications registered to receive messages with the different namespaces. For example, a message router 215 at a consumer's personal computer 10 may be used to facilitate interaction between different applications on the consumer's personal computer 10; between one or more applications on the consumer's personal computer 10 and the consumer's PDA 12; between one or more applications on the consumer's personal computer 10 and the consumer's mobile telephone 14; between one or more applications on the consumer's mobile telephone 14 and the consumer's PDA 12; and/or between one or more applications on the consumer's personal computer 10 and the central office of a communications service provider (such as a telephone service provider). Moreover, the message router 215 may be used to facilitate interaction with applications running on communication devices of different consumers. While applications are discussed herein as particular examples of listeners, a listener may be a process within an application, a service, a portion of a user interface, a thread, and/or any object that can receive and process a message. Accordingly, a single application may include a plurality of listeners, and different listeners of a same application may be separately registered in the Listener Registry 401.

Figure 7:
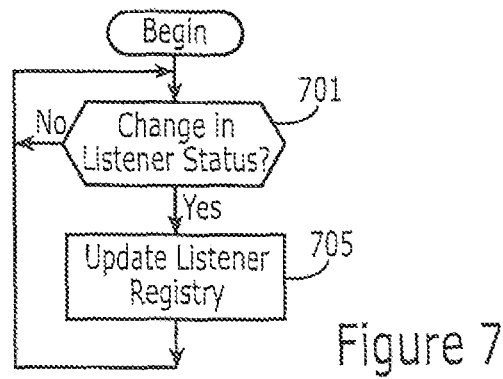
FIGS. 7-11 are flow charts illustrating operations of message routers according to embodiments of the present invention.

Accordingly, each application that is to interact with the message router 215 may be required to register its listeners with the message router 125 and identify namespaces to be used to determine which messages will be delivered to the listener. This information can thus be used to build the listener registry 401. As shown in FIG. 7, if an application initiates registration of a new listener with the message router 215 and/or if an application requests a change in status of a registered listener at block 701, the message router 215 may update the listener registry 401 at block 705. More particularly, any new listeners may be added to the listener registry 401 together with one or more namespaces to be associated with the new listener. Similarly, if a change in status of an existing listener is requested, the listener registry 401 may be updated by adding and/or deleting one or more namespaces to be associated with the listener. Accordingly, the listener registry 401 may list a plurality of listeners registered with the message router 215, and one or more namespaces may be associated with each of the registered listeners. The namespace or namespaces associated with each listener may be used by the message router to determine which messages should be routed to each of the listeners registered with the listener registry. Each listener may thus maintain its own information in the listener registry 401, and each listener may insert its own information into the listener registry without requiring polling on the part of the message router 215. Moreover, if an application looses connection with the message router 215 and/or client proxy 407, the application may remove all the registration of all of its listeners from the listener registry 401.

Figure 8:
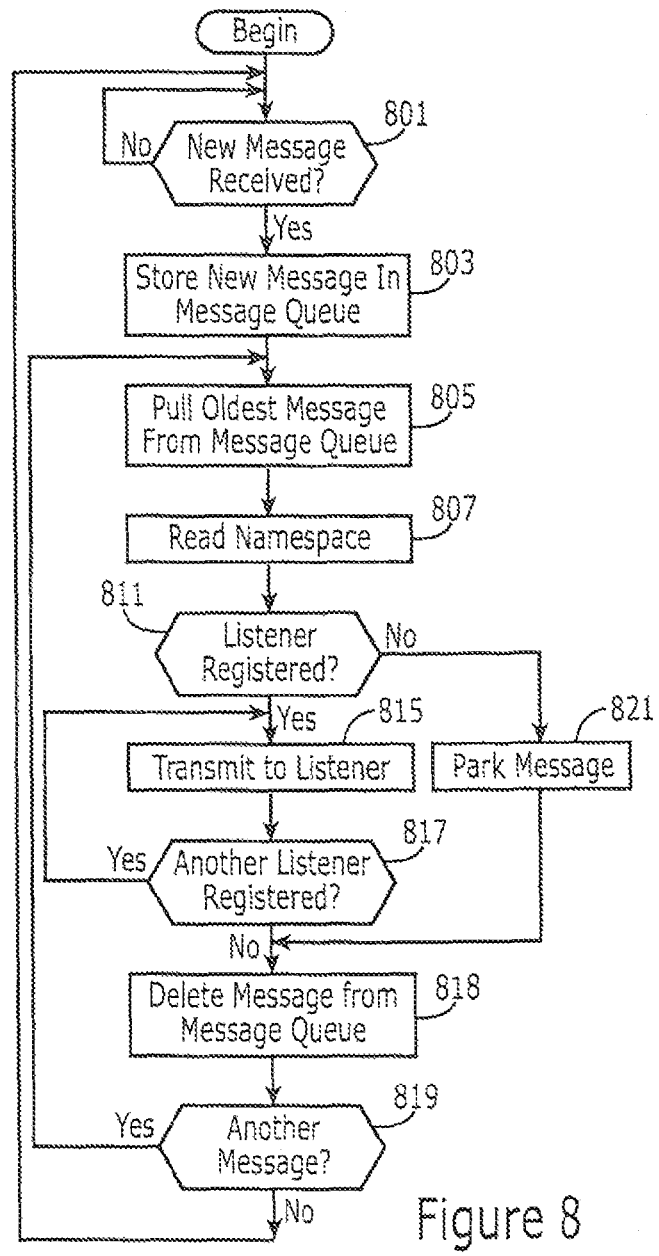

As shown in FIG. 8, if a new message is received at the client proxy 407 at block 801, the new message may be stored in the message queue 403 at block 803, and storing a new message may trigger review of all messages in the message queue 403. More particularly, an oldest message in the message queue 403 may be pulled at block 805, and a namespace of the oldest message may be read at block 807. The message router 215 uses the listener registry 401 to identify a first listener of the namespace of the oldest message. If a first listener for the namespace is identified at block 811, the message is transmitted to the first listener at block 815. If no listeners are registered for the namespace at block 811, the message is parked at block 821 as discussed in greater detail below with respect to FIG. 9.

At block 817, the message router 215 determines if there is another listener registered for the namespace included in the message. Accordingly, the operations of blocks 811 and 815 may be repeated for all listeners registered for the namespace included in the message.

Once the operations of blocks 811 and 815 have been performed for all listeners of the message namespace, the message may be deleted from the message queue 403 at block 818. At block 819, the message router 215 determines if there is another message in the message queue 403. Accordingly, the operations of blocks 805, 807, 811, 815, 821, 817, and 818 may be repeated for each message in the message queue 403. On the other hand, if there are no listeners registered for the message namespace at block 811, the message may be parked in parked message queue 405 at block 821 and deleted from the message queue 403 at block 818, and the message router 215 may then determine if there is another message in the message queue 403 at block 819.

As discussed above with respect to FIG. 8, if there are no listeners registered in the listener registry 401 as a recipient(s) of messages including the namespace of the message, the message may be parked as noted at block 821. Parking of messages is now discussed in greater detail with respect to FIG. 9. If a new message is to be parked at block 901 (as determined for example at blocks 811 and 821 of FIG. 8), a timestamp may be assigned to the message at block 905, and the message and the timestamp may be stored together in the parked message queue 405 at block 905. A configurable limit, however, may be provided for a number of messages that may be parked at one time, and additional messages may be turned away (i.e., dropped) if the parked message queue 405 is full. In addition, the message router 215 may attempt to start a target application at block 907. More particularly, an additional field of the message may identify a particular target application to which the message should be sent, and the message router 215 may attempt to start the target application identified in the message.

Figure 10:
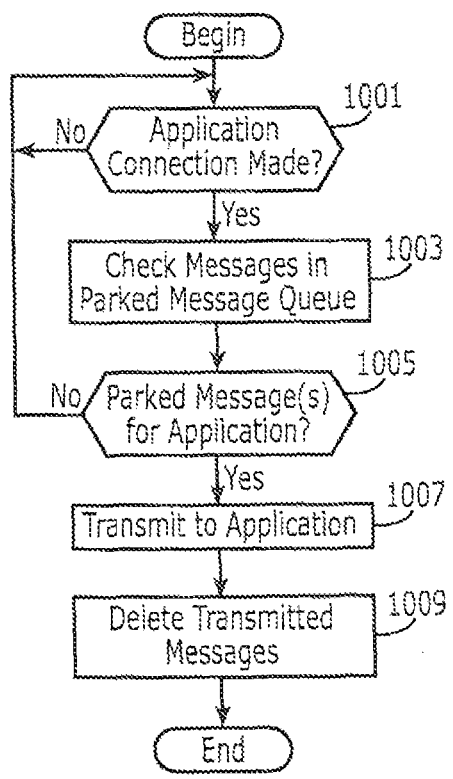

As shown in FIG. 10, if an application makes connection to the client proxy 407 of the message router 215 at block 1001, the message router 215 and/or the client proxy 407 may check all messages in the parked message queue 405 at block 1003. Application connection may include registration of any listeners of the application with the listener registry 401. If any of the parked messages in the parked message queue 405 includes a namespace that is associated with the application (and/or a listener thereof) that made the connection to the message router at block 1005, the message router 215 may transmit the message(s) including the associated namespace to the application (and/or a listener thereof) that made the connection at block 1007. Any messages transmitted at block 1007 may then be deleted from the parked message queue 405 at block 1009. Moreover, operations of FIG. 10 may be performed any time a new application connection is made at block 1001.

Figure 9:
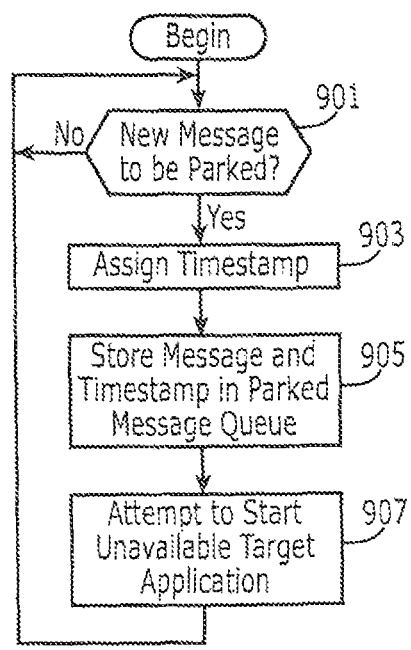

By providing that operations of FIG. 10 are performed independently of operations of FIGS. 8 and 9, the message router 215 may be better able to efficiently transmit a message(s) to registered listeners while parking other message(s) for which no listeners are registered. Accordingly, an unavailable application may not result in significant delay of transmission to available listeners. More particularly, by attempting to start an unavailable application at block 907 of FIG. 9 without delaying operations of FIGS. 8 and 9 until the unavailable application actually makes connection, message processing for other messages and/or for available listeners may continue even if an unavailable application does not make a connection to the message router 215 in a reasonable period of time. By providing the parked message queue 405 separate from the message queue 403, parked messages for unavailable applications may be processed in parallel with the messages for available listeners.

Figure 11:
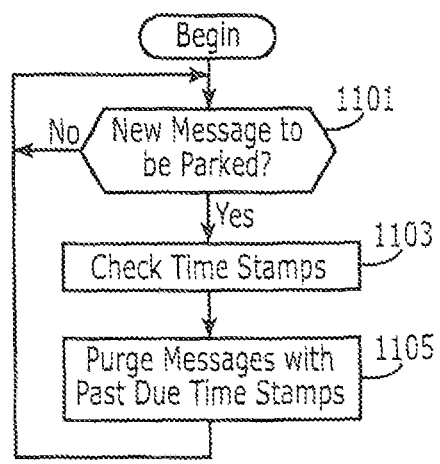

The external client proxy 407 may process parked messages. Because an unavailable listener application may not make a connection to the message router 215 in a reasonable period of time (or at all), the message router 215 may purge parked messages that have been in the parked message queue 405 for a sufficient period of time (as indicated by the respective timestamps). As shown in FIG. 11, if a new message is to be parked at block 1101, the message router may check the timestamps of all parked messages in the parked message queue 405 at block 1103. At block 1105, the message router 215 may purge all parked messages having past due timestamps from the parked message queue 405 at block 1105.

According to embodiments of the present invention, the message router 215 may be provided as an XML message router resident on a consumer communications device (such as a personal computer) to facilitate interactions between different software applications resident on the consumer communications device and/or other devices remote from the consumer communications device. The different applications can thus interact, send commands, and/or share information across processes on the same device and/or across a network such as the Internet.

Messages and/or commands may be asynchronously routed to client applications based on routing namespaces as discussed above, and these applications may be co-resident on or external to the device on which the message router is resident. A new address book application, for example, may thus be able to start dialing phone numbers, sending e-mails, remotely recording movies, launching instant messenger chats, and/or using any other published service, all using XML messages. Moreover, an application publishing services does not need to have prior knowledge of other applications that use its published services.

An XML message router proxy according to embodiments of the present invention may provide "guaranteed" delivery of messages whereby a message may be delivered to a target application even if the target application is not running at the time the message is received by the XML message router proxy. If the target application is not active, the message may be parked in the parked message queue while the target application is started. Once the target application is started, the XML message router proxy may identify all messages in the parked message queue that are intended for the target application that has been started and then transmit the identified messages to the target application and delete them from the queue. Moreover, on-destroy processing by the XML message router proxy may provide message delivery to a target application even if a connection to the target application has been lost.

As discussed above, multiple listeners may be registered in the listener registry to listen for messages having the same namespace. Stated in other words, the listener registry may associate multiple listeners with the same namespace. Accordingly, a same message may be transmitted to multiple applications and/or listeners so that a single message may result in multiple actions being taken.

The XML message router may also provide publishing of the presence of applications connected thereto. Using an XMPP connection(s), the presence of one or more applications may be made known to other users, devices, and/or applications. A user may thus be able to choose a quickest and/or most effective means of communicating with a client application. Moreover, XMPP server integration may allow a consumer to securely access services in their home, for example, to securely operate home monitoring devices from work or vacation, to remotely control networkable hardware.

In the drawings and specification, there have been disclosed embodiments of the invention and, although specific terms are employed, they are used in a generic and descriptive sense only and not for purposes of limitation, the scope of the invention being set forth in the following claims.

That which is claimed is:

1. A method of routing messages, the method comprising:
   providing a listener registry of a plurality of listeners and associated namespaces wherein at least one namespace is associated with each of the plurality of listeners and a single namespace can be associated with more than one listener;
   receiving first and second messages from respective originating applications wherein the first and second messages include respective first and second message namespaces;
   storing the first and second messages in a message queue;
   determining if a listener from the listener registry is associated with the first message namespace;
   in response to determining that no listener from the listener registry is associated with the first message namespace, storing the first message in a parked message queue separate from the message queue; and
   handling the second message in the message queue independently of the first message;
   wherein the first message includes an identification of a target application, the method further comprising:
   in response to determining that no listener from the listener registry is associated with the first message namespace, initiating the target application identified in the first message;
   accepting connection of the target application;
   responsive to accepting connection of the target application, identifying the first message in the parked message queue including the identification of the target application; and
   responsive to identifying the first message in the parked message queue, transmitting the first message from the parked message queue to the target application.

2. The method of claim 1, further comprising, after the first message has been in the parked message queue for a predetermined period of time, deleting the first message from the parked message queue.

3. A method according to claim 1 further comprising:
   in response to determining that a listener from the listener registry is associated with the first message namespace, transmitting the first message to the listener.

4. A method according to claim 3 wherein the first message is received at a message router residing on a consumer communications device, and wherein each of the originating application and listener both reside on the consumer communications device.

5. A method according to claim 3 wherein the first message is received at a message router residing on a consumer communications device, and wherein the listener resides on a device remote from the consumer communications device.

6. A method according to claim 5 further comprising:
   deleting the first and second messages from the message queue.

7. A method of routing messages, the method comprising:
   providing a listener registry of a plurality of listeners and associated namespaces wherein at least one namespace is associated with each of the plurality of listeners and a single namespace can be associated with more than one listener;
   receiving a message from an originating application wherein the message includes a message namespace;
   storing the message in a message queue;
   determining if a listener from the listener registry is associated with the message namespace;
   in response to determining that no listener from the listener registry is associated with the message namespace, storing the message in a parked message queue separate from the message queue; and
   deleting the message from the message queue;
   wherein the message includes an identification of a target application, the method further comprising:
   in response to determining that no listener from the listener resistor is associated with the message namespace, initiating starting the target application;
   accenting connection of the target application;
   responsive to accepting connection of the target application, identifying the message in the parked message queue including the identification of the target application; and
   responsive to identifying the message in the parked message queue, transmitting the message from the parked message queue to the target application.

8. A method according to claim 7 further comprising:
   after the message has been in the parked message queue for a predetermined period of time, deleting the message from the parked message queue.

9. A method according to claim 7 further comprising:
   in response to determining that a listener from the listener registry is associated with the message namespace, identifying the listener from the listener registry; and
   after identifying the listener, transmitting the message to the listener.

10. A method according to claim 9 wherein the message is received at a message router residing on a consumer communications device, and wherein each of the originating application and the listener both reside on the consumer communications device.

11. A method according to claim 9 wherein the message is received at a message router residing on a consumer communications device, and wherein the listener resides on a device remote from the consumer communications device.

* * * * *

UNITED STATES PATENT AND TRADEMARK OFFICE
CERTIFICATE OF CORRECTION

| | |
|---|---|
| PATENT NO. | : 9,191,347 B2 |
| APPLICATION NO. | : 14/286583 |
| DATED | : November 17, 2015 |
| INVENTOR(S) | : Johnson et al. |

It is certified that error appears in the above-identified patent and that said Letters Patent is hereby corrected as shown below:

In the Claims:
Column 20, Claim 7, Line 27: Please correct "resistor" to read -- registry --
Column 20, Claim 7, Line 29: Please correct "accenting" to read -- accepting --

Signed and Sealed this
Fifteenth Day of March, 2016

Michelle K. Lee
*Director of the United States Patent and Trademark Office*